(12) United States Patent
Horng et al.

(10) Patent No.: US 7,936,539 B2
(45) Date of Patent: May 3, 2011

(54) BOTTOM SPIN VALVE GMR SENSOR INCORPORATING PLURAL OXYGEN SURFACTANT LAYERS

(75) Inventors: Cheng T. Horng, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1084 days.

(21) Appl. No.: 11/717,973

(22) Filed: Mar. 14, 2007

(65) Prior Publication Data

US 2007/0159732 A1    Jul. 12, 2007

Related U.S. Application Data

(62) Division of application No. 10/661,038, filed on Sep. 12, 2003, now Pat. No. 7,201,827.

(51) Int. Cl.
    *G11B 5/39* (2006.01)
(52) U.S. Cl. ............ 360/324.1; 360/324.11; 360/324.12
(58) Field of Classification Search ............... 360/324.1, 360/324.11, 324.12, 324.2
    See application file for complete search history.

(56) References Cited

U.S. PATENT DOCUMENTS

| | | | |
|---|---|---|---|
| 6,141,191 A | 10/2000 | Lee et al. | |
| 6,414,825 B1 | 7/2002 | Inoue et al. | |
| 6,567,246 B1 | 5/2003 | Sakakima et al. | |
| 2003/0197505 A1* | 10/2003 | Sakakima et al. | ............ 324/252 |
| 2004/0252416 A1* | 12/2004 | Horng et al. | ............... 360/324.1 |
| 2004/0252418 A1* | 12/2004 | Horng et al. | ............. 360/324.12 |
| 2006/0056116 A1* | 3/2006 | Horng et al. | ............. 360/324.11 |
| 2006/0162148 A1* | 7/2006 | Horng et al. | ............... 29/603.08 |
| 2006/0181815 A1* | 8/2006 | Horng et al. | ............. 360/324.12 |
| 2006/0262459 A1* | 11/2006 | Kamai et al. | ............. 360/324.11 |
| 2007/0223151 A1* | 9/2007 | Horng et al. | ............. 360/324.11 |
| 2007/0268633 A1* | 11/2007 | Horng et al. | ............. 360/324.12 |
| 2007/0297103 A1* | 12/2007 | Zhang et al. | ............. 360/324.12 |
| 2008/0144233 A1* | 6/2008 | Amano et al. | ............. 360/324.2 |
| 2008/0278867 A1* | 11/2008 | Fukumoto et al. | ........ 360/324.12 |
| 2009/0161266 A1* | 6/2009 | Wang et al. | ................ 360/324.1 |

OTHER PUBLICATIONS

"40% tunneling magnetoresistance after anneal at 380° C. for tunnel junctions with iron-oxide interface layers," by Zhang et al., Jrnl. of Applied Physics, vol. 89, No. 11, Jun. 1, 2001, pp. 6665-6667.
"Oxygen as a surfactant in the growth of giant magnetoresistance spin valves," by Egelhoff, Jr. et al., J. Appl. Phys., vol. 82, No. 12, Dec. 15, 1997, pp. 6142-6151.

* cited by examiner

*Primary Examiner* — Jefferson Evans
(74) *Attorney, Agent, or Firm* — Saile Ackerman LLC; Stephen B. Ackerman

(57) ABSTRACT

A bottom spin-valve GMR sensor has been fabricated that has ultra-thin layers of high density and smoothness. In addition, these layers are inherently furnished with sub-monolayer thick oxygen surfactant layers. The sensor is fabricated using a method in which the layers are sputtered in a mixture of Ar and $O_2$. A particularly novel feature of the method is the use of a sputtering chamber with an ultra-low base pressure and correspondingly ultra-low pressure mixtures of Ar and $O_2$ sputtering gas (<0.5 millitorr) in which the admixed oxygen has a partial pressure of less than $5 \times 10^{-9}$ torr.

9 Claims, 2 Drawing Sheets

BOTTOM SPIN VALVE GMR SENSOR INCORPORATING PLURAL OXYGEN SURFACTANT LAYERS

This is a divisional application of U.S. Ser. No. 10/661,038, filed on Sep. 12, 2003 now U.S. Pat. No. 7,201,827, which is herein incorporated by reference in its entirety.

BACKGROUND OF THE INVENTION

1. Field of the Invention

This invention relates generally to the fabrication of a giant magnetoresistive (GMR) magnetic read head, more specifically to the use of an ultra-high vacuum sputtering system to form GMR layers which are inherently furnished with sub-monolayers of adsorbed oxygen (oxygen surfactant layers) for improved deposition properties.

2. Description of the Related Art

Early forms of magnetic read heads decoded magnetically stored data on media such as disks and tapes by making use of the anisotropic magnetoresistive effect (AMR) in magnetic materials such as permalloy. This effect was the change in the electrical resistance, r, of certain magnetic materials in proportion to the angle between the direction of their magnetization and the direction of the current flow through them. Since changing magnetic fields of moving magnetized media, such as magnetically encoded tapes and disks, will change the direction of the magnetization in a read head, the resistance variations of the AMR effect allows the information on such encoded media to be sensed and interpreted by appropriate circuitry.

One shortcoming of the AMR effect was the fact that it produced a maximum fractional resistance change, DR/R (where DR is the change in resistance between the magnetic material subjected to its anisotropy field, $H_k$, and the material subjected to zero field), which was only on the order of a few percent. This made the sensing process difficult to achieve with accuracy.

In the late 1980's and early 1990's the phenomenon of giant magnetoresistance (GMR) was discovered and soon applied to read head technology. The GMR effect derives from the fact that thin ($\approx$20 angstroms) layers of ferromagnetic materials, when separated by even thinner ($\approx$10 angstroms) layers of conductive but non-magnetic materials, will form ferromagnetic (parallel spin direction of the layers) or antiferromagnetic states (antiparallel spin direction of the layers) by means of exchange interactions between the spins. As a result of spin dependent electron scattering as electrons crossed the layers, the magnetoresistance of such layered structures was found to be significantly higher in the antiferromagnetic state than the ferromagnetic state and the fractional change in resistance was much higher than that found in the AMR of individual magnetic layers.

Shortly thereafter a version of the GMR effect called spin valve magnetoresistance (SVMR) was discovered and implemented. In the SVMR version of GMR, two ferromagnetic layers such as CoFe or NiFe are separated by a spacer layer, which is a thin layer of electrically conducting but non-magnetic material such as Cu. One of the ferromagnetic layers has its magnetization direction fixed in space or "pinned," by exchange anisotropy with an antiferromagnetic layer deposited directly upon it. The remaining ferromagnetic layer, the unpinned or free layer, can respond to small variations in external magnetic fields such as are produced by moving magnetic media, (which do not affect the magnetization direction of the pinned layer because the exchange pinning strength exceeds the external fields), by rotating its magnetization direction. This rotation of one magnetization relative to the other then produces changes in the magnetoresistance of the three layer structure which is generally proportional to the cosine of the angle between the magnetization directions.

The spin valve structure has now become the implementation of choice in the fabrication of magnetic read head assemblies. Different configurations of the spin valve have evolved, including the bottom spin valve, wherein the pinned layer is at the bottom of the configuration and the top spin valve, wherein the pinned layer is at the top. In addition, the qualities of the spin valve have been improved by forming the pinned layer as a synthetic antiferromagnet, which is a layered configuration comprising two ferromagnetic layers separated by a non-magnetic coupling layer, wherein the ferromagnetic layers are magnetized in antiparallel directions.

The present challenge to the spin valve form of sensor is to make it suitable for reading recorded magnetic media with recorded densities exceeding 20 Gb/in$^2$. This challenge can be met by making the free layer extremely thin, for improved resolution in the track direction, while not reducing DR/R, which is a measure of the sensor's sensitivity. One way of achieving this goal is by forming the spin valve on a seed layer, which is a layer of material whose purpose is to improve the crystalline structure of magnetic layers grown upon it. The present inventors have already shown that spin valves fabricated using a NiFeCr seed layer have a greatly enhanced GMR effect as measured by DR/R. Presently, the NiFeCr seed layer is becoming the industry standard for heads capable of reading densities exceeding 20 Gb/in$^2$. The Cr composition of the seed layer in these heads is between 20 and 50 atomic percent, with the optimum value of DR/R obtained with 40 atomic percent. Lee et al. (U.S. Pat. No. 6,141,191) disclose a top spin valve using a NiFeCr seed layer wherein the atomic percentage of Cr is between 20 and 50%. Lee et al. report a DR/R for the configuration of 7.7% which is a significant improvement over similar sensor formed on Ta seed layers. According to Lee et al., the performance improvement is a result of being able to use NiMn as an antiferromagnetic pinning layer, which produces a high pinning field and high blocking temperature.

The present inventors have been using a bottom spin valve configuration (see below) meeting the requirements for reading recorded densities greater than 30 Gb/in$^2$, yet its performance would be inadequate for reading area densities of 60 Gb/in$^2$:

NiCr(40%)60/MnPt100/CoFe15/Ru7.5/CoFe20/Cu18/ OSL/CoFe—NiFe/Ru10/Ta10.

In the above configuration the numbers (other than the 40%) refer to approximate layer thicknesses in angstroms. The NiCr seed layer has 40% atom percent Cr. MnPt is the antiferromagnetic pinning layer, CoFe/Ru/CoFe is a synthetic antiferromagnetic pinned layer, Cu is the spacer layer, OSL represents an oxygen surfactant layer formed on the Cu spacer layer, the surfactant layer being a sub-monolayer of oxygen deposited on the Cu surface by exposing the Cu layer to low-pressure oxygen in a separate chamber, CoFe—NiFe is a composite free layer formed by sequentially sputtering CoFe and NiFe on the surfactant layer and Ru/Ta is a composite capping layer wherein the Ru is used to prevent interdiffusion between the Ta and the NiFe. The configuration provides a DR/R of 12.7% and a sheet resistance, $R_s$, of 19.6 ohm/sq.

In order to form sensor structures capable of reading densities in excess of 60 Gb/in$^2$, it is necessary to reduce the track width of the sensor and to reduce the thickness of its free layer, while still retaining sufficient ratios of DR/R for adequate signal strength. Improvement of DR for a reduced trackwidth sensor can be obtained either by increasing sheet resistance of the sensor or DR/R or both. Increase in $R_s$ and DR/R can be obtained by thinning the GMR film thickness. In this respect, thinning the Cu spacer layer is particularly advantageous because it has a very low $R_s$. For example, Cu spacer thickness can be reduced from 30 A to 22 A when the Ta seed layer is replaced by the NiFeCr (NiCr) seed layer. For such spin valves, DR/R is increased from 6.5% to 9.5%. An NiFeCr (NiCr) seed layer allows the synthetic pinned layer upon which the Cu spacer layer is deposited, to be grown with a much smoother surface, thereby enhancing the spin dependent specular reflectivity of conduction electrons at the inner surface of the Ru/CoFe layers within the synthetic pinned layer. When the surface of the Cu layer is treated with oxygen to form an oxygen surfactant layer (OSL), the thickness of the Cu layer can be further reduced to between 22 A and 18 A. With an oxygen dose of $10^{-4}$ torr-sec, the surfactant layer is less than a mono-layer thick. The formation of the OSL suppresses the interdiffusion at the Cu/CoFe interface when the CoFe free layer is deposited on the Cu layer. This increases the spin-dependent transmission of conduction electrons and suppresses scattering at the interface. The oxygen is highly mobile and has a strong tendency to diffuse out to the surface of the free layer to improve the specular reflectivity at the GMR outer surface of the CoFe—NiFe/Ru (the surface between the free layer and the capping layer). Because of the high mobility of oxygen in the Cu spacer layer, the oxygen surfactant layer can be formed at a variety of positions within the Cu layer during its formation. Thus, the surfactant layer can be formed at the Cu bottom surface where it meets the pinned layer (the CoFe/Cu interface), in the middle of the Cu layer, or at the Cu/CoFe interface with the free layer.

GMR sensors capable of reading area densities of approximately 45 Gb/in$^2$, have been made using the following configuration:

NiCr(40%)55/MnPt125/CoFe15/Ru7.5/CoFe20/Cu18/
SL/CoFe10-NiFe20/Ru10/Ta10.

$R_s$ of this configuration is approximately 19.5 ohm/sq and DR/R is approximately 12.8%. Since DR=$R_s$×DR/R, DR=2.5 ohm/sq.

For recording densities greater than 60 Gb/in$^2$, DR must be even greater. A practical approach to achieving this increase is to use a thinner free layer, such as CoFe 5-NiFe 20, together with a thinner layer of MnPt (eg. 100 A), to reduce current shunting through the MnPt. However, the thermal stability of a GMR sensor with these features has been found to be poor. The GMR configuration has, therefore, used CoFe10/NiFe15 and MnPt 125. In this configuration a DR=2.85 is obtained, which is marginally adequate for the 60 Gb/in$^2$ sensor.

Up to the present time, GMR film stacks have been formed by sputtering in a sputtering system with a base pressure of approximately $10^{-8}$ torr, using Ar as the sputtering gas at a pressure of a few millitorr. This is a typical industry standard for the present generation of sputtered spin valves. Note in this regard that Sakakima et al. (U.S. Pat. No. 6,567,246), who will be discussed further, describes a sputtering process (column 16, lines 45-50) with $10^{-8}$ torr base pressure and an Ar pressure of 0.8 millitorr.

It is well known that thin film sputtering with an ultra-low sputtering pressure produces a smoother, flatter and denser film. Consequently, under these sputtering conditions, allows a thinner film to be formed with good qualities. Sputtering with low gas pressure of the sputtering gas (<1 millitorr) requires an ultra-high vacuum system and it is expected that by coupling the sputtering of GMR layers in such a system along with the addition of oxygen to the gas mixture to form a surfactant layer, should allow the formation of very high quality thin films. Presently, the design of sputtering systems has improved greatly and at least one commercially available manufacturing system (the Anelva C-7100), allows the production of a base pressure of $5 \times 10^{-9}$ torr and an argon sputtering gas pressure as low as 0.1 millitorr. The present invention provides a GMR read sensor suitable for recorded densities greater than 100 Gb/in$^2$ by making advantageous use of such new sputtering systems. As noted above, Sakakima is utilizing a very high vacuum sputtering system for forming MR elements with oxide magnetic films such as $CoFe_2O_4$, wherein such films are in the thickness range of several nanometers, significantly thicker than that envisioned in the present invention.

Inoue et al. (U.S. Pat. No. 6,414,825) teach a method for improving the thermal conductivity and hardness of shield gap films by sputtering BN, SiN and CN layers in the presence of oxygen and Ar. In short, there is evidence that the use of Ar and oxygen as sputtering gases can improve the qualities of a recording medium as well as the film layers in the sensor used to read that medium. Kanbe et al. (U.S. Pat. No. 6,221,508) teaches the use of Ar sputtering with the admixture of small percentages of other gases (including oxygen at approx. 10%) in forming recording media with reduced grain size for low-noise magnetic recording.

None of the prior art cited teaches the formation of GMR read sensors having ultra-thin layers that are rendered smooth by the formation of oxygen surfactant layers during ultra-low pressure sputtering with Ar as the sputtering gas and the admixture of a small amount of oxygen.

SUMMARY OF THE INVENTION

A first object of this invention is to provide a method for forming a giant magnetoresistive (GMR) read head sensor element capable of reading recorded media having densities exceeding 100 Gb/in$^2$, along with the giant magnetoresistive (GMR) sensor element so formed.

A second object of this invention is to provide a method of forming such a read head in which the layers are smooth and dense and inherently furnished with oxygen surfactant layers at their interfaces.

A third object of this invention is to provide a method of forming such a read head wherein the oxygen content of the antiferromagnetic pinning layer is better controlled and is, thereby, provided with improved exchange coupling properties.

A fourth object of this invention is to provide a method of forming such a read head wherein a thicker free layer exhibits greater thermal stability during head use.

A fifth object of the present invention is to provide the read head having the properties resulting from the formation method hereinafter described.

In accord with the object of this invention there is provided in a first embodiment a single bottom spin valve sensor element formed by sputtering successive GMR layers on a NiCr seed layer, wherein the sputtering process is carried out at an ultra-low base pressure of approximately $5 \times 10^{-9}$ torr using argon admixed with oxygen as a sputtering gas at a pressure as low as 0.1 millitorr (an order of magnitude below typical prior art sputtering pressures). The GMR formation process of the present invention utilizes the $Ar/O_2$ sputtering gases in two different combinations, to obtain two different results. First, every GMR layer, with the exception of the Cu spacer layer and the Ru capping layer is sputtered by the combined $Ar/O_2$ gas, preferably at a total pressure of approximately 0.4 millitorr (within the range of 0.1 to 0.6 millitorr). Within this combination, the oxygen is present at a partial pressure of approximately $5\times10^{-9}$ torr. This pressure is achieved by combining argon gas from two separate input sources, (1) a high purity (99.9995%) argon source which contains less than 0.5 ppm of $O_2$ and (2) another source of equally pure argon which is controllably doped with approximately 500 ppm (between 400 and 600) of $O_2$. The admixed gas contains an oxygen partial pressure of between approximately $1\times$ and $10\times10^{-9}$ torr. By combining sources (1) and (2) through a mixture of 25 sccm of (1) and 0.5 sccm of (2), the required $5\times10^{-9}$ torr partial pressure $O_2$ gas mixture is obtained. The sputtering of layers in this combined gas produces the dense, smooth layers that are an important part of the present invention. Forming the OSL on the Cu layer, however, requires more oxygen than is present in the sputtering mixture, so additional oxygen must be supplied to form the OSL. This can be done by increasing the amount of oxygen in the sputtering mixture of the Cu until a dose of approximately $10^{-4}$ torr-sec is obtained. Due to the mobility of the oxygen in each layer, the oxygen has a tendency to "float" (diffuse) to the surface, effectively producing an OSL on each sputtered layer. It is noted that the sputtering process time is not lengthened by the admixture of oxygen, because of the small amount of oxygen that is used.

There is a second and different way of forming an OSL on the Cu spacer and Ru capping layers. In this alternative approach, the sputtering gas for both the Cu and Ru layers is pure Ar. To produce an OSL on the Cu and Ru layers, the sputtered layers are exposed to $O_2$ gas in a separate chamber. The $O_2$ gas is at a pressure of approximately $3\times10^{-5}$ torr and the exposure time is approximately 30 seconds to give a dose of approximately $10^{-4}$ torr-sec. It is noted that the OSL on the Ru capping layer has the beneficial effect of oxidizing the Ta layer which caps the entire configuration.

The layer configuration of the first embodiment is indicated below:

NiCr 40/MnPt 125/CoFe 19/Ru 7.5/CoFe 20/Cu 18/OSL/CoFe 10-NiFe 20/Ru/Ta

This configuration comprises a substrate (not indicated), a 40 angstrom thick NiCr seed layer formed on the substrate, a thin (approximately 125 angstroms thick) antiferromagnetic MnPt pinning layer which is formed on the seed layer by sputtering a vacuum melted MnPt target, which has a low oxygen concentration (rather than the usual target made from sintering, which has a higher oxygen concentration), a synthetic antiferromagnetic (SyAF) pinned layer comprising a CoFe (19)/Ru(7.5)/CoFe(20) tri-layer of the approximate dimensions indicated in the parentheses above. It is to be noted that the use of vacuum melted MnPt target allows better control of the oxygen content in the MnPt layer, which, in turn, advantageously affects its exchange coupling properties. A non-magnetic Cu spacer layer, approximately 18 angstroms thick is then formed on the SyAF layer using a different density of sputtering gases and an oxygen surfactant layer (OSL) is formed on the Cu layer. On this OSL, an ultra-thin ferromagnetic free layer is then formed, said layer being a layer of CoFe of approximate thickness 10 angstroms on which is formed a layer of NiFe of approximate thickness 20 angstroms.

In a second embodiment there is provided a method of forming a configuration that differs from that of the first embodiment by the substitution of a NiFeCr—NiFe seed layer, hence:

NiFeCr—NiFe/MnPt 125/CoFe 19/Ru 7.5/CoFe 20/Cu 18/OSL/CoFe 10-NiFe 20/Ru/Ta

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein.

DESCRIPTION OF THE PREFERRED EMBODIMENTS

Figure 1A:
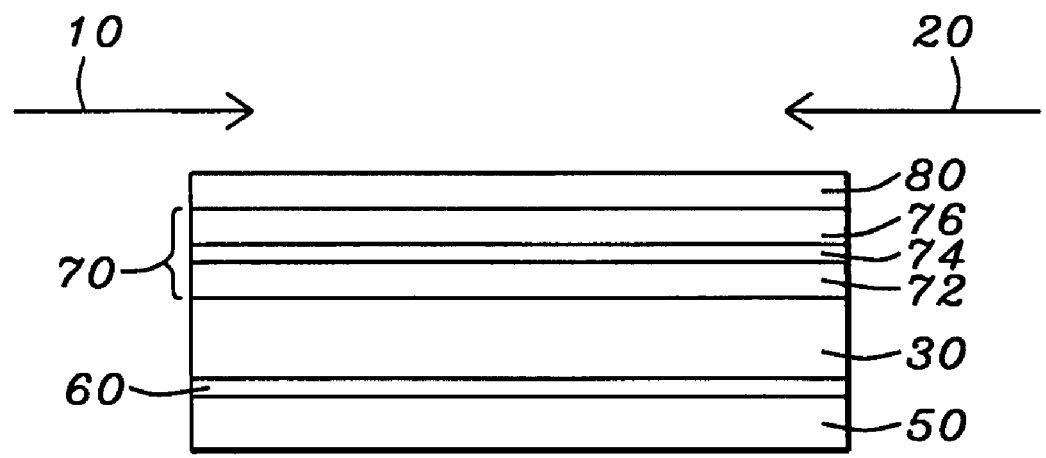
FIGS. 1a-1c are schematic cross-sectional views of a bottom spin valve sensor element formed in accord with a first second embodiments of the method of the present invention.

The present invention provides, in each of two embodiments, a method for fabricating a GMR bottom spin valve sensor element by forming its layers in an ultra-low pressure sputtering system having a base pressure less than $10^{-8}$ torr and utilizing ultra low pressure (<0.5 millitorr) $Ar/O_2$ gas as a sputtering gas. The sputtering process produces smooth, dense and thin GMR layers, all of which are inherently provided with oxygen surfactant layers (OSL) as a result of the diffusion of incorporated oxygen to their surfaces. In addition, the sensor includes a spacer layer, not formed with the same density sputtering gases, but also incorporating an OSL. The sensor element so formed can read recorded densities exceeding 100 Gb/in$^2$.

Experimental Results

Sputtering GMR layers in an ultra-low pressure sputtering environment (eg. the commercially available Anelva device) and using an ultra low pressure mixture of Ar and $O_2$ as puttering gases, produces thin film layers with the extremely advantageous properties of smoothness and high density. In addition, the mobility of the oxygen that becomes incorporated within the layers causes it to diffuse to each layer surface where it forms an oxygen surfactant layer (OSL), which is also advantageous for the laminated layer structure. In the present experimental work that led to the determination of the sensor layer configuration of the claimed invention, the seed layer on which the GMR sensor layers are formed is sputtered from a NiCr(40%) target and the seed layer is formed to a preferred thickness of approximately 40 A, but a range between approximately 30 and 60 angstroms is acceptable. The use of the $O_2$ doped Ar as a sputtering gas in the mixtures as discussed above produces extremely high DR/R for a sensor configuration formed on the NiCr seed layer. The best DR/R ratios obtained when only Ar is used as a sputtering gas (as in our prior art depositions) required a seed layer of NiFeCr(36)/NiFe(8) (thicknesses in angstroms in the parentheses) and the DR/R was less than obtained with the $Ar/O_2$ mixture. When $Ar/O_2$ is used to sputter the free layer in the method of the present claimed invention, it is found that the incorporated oxygen reduces the magnetic moment of the CoFe by as much as 15%. To maintain a proper magnetic moment, a thicker CoFe layer is required, which is actually advantageous as it improves the thermal stability of the free layer by more effectively dissipating heat during operation of the head.

The results below indicate various magnetic performance parameters for 7 sensor configurations. Configuration (1) is formed in the prior art sputtering system and is provided only for reference purposes. Configurations (2)-(7) represent various seed layers and sputtering gas combinations, all for the low pressure sputtering of the present invention. The relevant parameters in all cases are coercive force ($H_c$) of the free layer, for which lower values are advantageous, and DR/R, which, taken together with sheet resistance, $R_s$, is a measure of output performance and DR, which is a direct measure of output amplitude. It is also noted that the pinning field is substantially the same for all configurations. Finally, it is further noted that the free layer magnetic moment is slightly reduced in configurations (5)-(7), indicating the effect of the incorporated oxygen. This can be improved by thickening the free layer, which will also improve its DR/R and thermal stability.

NiCr55/MP125/CoFe19/Ru7.5/CoFe20/Cu18/OSL/
CoFe10/NiFe20/Ru10/Ta10                         (1)

Sputter Gas: Ar (2 millitorr for Cu, 5 millitorr for MP (MnPt) with 38% Mn target)
$H_c$=11.06 Oe
$R_s$=19.33 ohm/sq
DR/R=12.92%
DR=2.50 ohm/sq NiFeCr36/NiFe9/MP125/CoFe19/Ru7.5/CoFe20/
Cu18/OSL/CoFe10/NiFe20/Ru10/Ta10                (2)

Sputter Gas: Ar (<0.5 millitorr, MnPt sputtered with 38% Mn target in (3)-(7))
$H_c$=5.52 Oe
$R_s$=19.10 ohm/sq
DR/R=15.06%
DR=2.88 ohm/sq NiFeCr36/NiFe9/MP125/CoFe19/Ru7.5/CoFe20/
Cu18/OSL/CoFe10/NiFe20/Ru5/Ta20                 (3)

Sputter Gas: Ar (<0.5 millitorr)
$H_c$=4.76 Oe
$R_s$=21.06 ohm/sq
DR/R=14.72%
DR=3.10 ohm/sq NiCr36/NiFe9/MP125/CoFe19/Ru7.5/CoFe20/Cu17/
OSL/CoFe10/NiFe20/Ru5/Ta20                      (4)

Sputter Gas: $O_2$/Ar (<0.5 millitorr, except for Cu and Ru)
$H_c$=2.47 Oe
$R_s$=21.29 ohm/sq
DR/R=15.09%
DR=3.21 ohm/sq NiCr40/MP125/CoFe19/Ru7.5/CoFe20/Cu17/OSL/
CoFe10/NiFe20/Ru5/Ta20                          (5)

Sputter Gas: $O_2$/Ar (<0.5 millitorr,)
$H_c$=8.83 Oe
$R_s$=21.78 ohm/sq
DR/R=15.79%
DR=3.44 ohm/sq NiCr40/MP125/CoFe19/Ru7.5/CoFe20/Cu17/OSL/
CoFe10/NiFe20/Ru5/Ta20                          (6)

Sputter Gas: $O_2$/Ar—Ar (<0.5 millitorr, only Ar used to sputter free layer)
$H_c$=7.88 Oe
$R_s$=21.21 ohm/sq
DR/R=15.83%
DR=3.36 ohm/sq NiCr40/MP125/CoFe19/Ru7.5/CoFe20/Cu17/OSL/
CoFe10/NiFe20/Ru5/Ta20                          (7)

Sputter Gas: $O_2$/Ar (<0.5 millitorr, MnPt sputtered with 38% Mn target)
$H_c$=10.97 Oe
$R_s$=22.87 ohm/sq
DR/R=15.79%
DR=3.61 ohm/sq Fabrication of the Preferred Embodiments Referring first to FIG. 1a, there is shown a schematic cross-sectional view of a first portion of a bottom spin valve GMR sensor formed in accord with the method of the first embodiment of this invention. When completed (FIG. 1b) it will be substantially the configuration disclosed as (7) above:

NiCr40/MP125/CoFe19/Ru7.5/CoFe20/Cu17/OSL/
CoFe10/NiFe20/Ru5/Ta20

As previously noted, a novel aspect of the preferred embodiment of the invention is the sputtering of the GMR sensor layers in an ultra-high vacuum sputtering environment, such as could be obtained in the sputtering chamber of the commercially available Anelva C-7100 manufacturing system. The sputtering process is carried out at an ultra-low base pressure of approximately $5\times10^{-9}$ torr using argon admixed with oxygen as a sputtering gas within a pressure range between 0.1 and 0.6 millitorr, but where 0.4 millitorr is preferable. Within the preferred embodiment, the oxygen portion of the gas combination is present at a partial pressure of approximately $5\times10^{-9}$ torr. This pressure is achieved by combining argon and argon/oxygen gases from two separate input sources. Referring to FIG. 1a, arrows (10) & (20) schematically represent sputtering gases impinging on sputtering targets which are not shown in the figure. Arrows (10) represent the gas from a high purity (99.9995%) argon source which contains less than 0.5 ppm of $O_2$. Arrows (20), represent sputtering gas from another source of equally pure argon which is controllably doped, preferably, with approximately 500 ppm (between 400 and 600 being acceptable) of $O_2$. By combining sources (10) and (20) through a mixture of approximately 25 sccm of (10) and approximately 0.5 sccm of (20), the required $5\times10^{-9}$ torr partial pressure $O_2$ gas mixture is obtained for sputtering the appropriate targets.

The sputtering of layers in this combined gas produces the dense, smooth layers that are an important part of the present invention. Moreover, due to the mobility of the oxygen in each layer, the oxygen has a tendency to "float" (diffuse) to the surface, effectively producing an OSL on each sputtered layer. It is noted that the sputtering process time is not lengthened by the admixture of oxygen, because of the small amount of oxygen that is used.

In accord with the present method there is first provided a substrate (50). On the substrate there is then formed, by sputtering in the ultra-low pressure Ar/$O_2$ mixture, a seed layer (60) of this invention, which is a layer of NiCr having Cr of approximately 40 atomic percent. The seed layer is formed to a thickness between approximately 35 and 45 angstroms, with approximately 40 angstroms being preferred. Upon this seed layer there is then formed an antiferromagnetic pinning layer (30), which in this embodiment is a layer of MnPt formed to a thickness of between approximately 100 and 150 angstroms but where approximately 125 angstroms is preferred. The MnPt layer is sputtered from a vacuum melted target which contains inherently less incorporated oxygen than the more typical MnPt target formed by a sintered process. The vacuum melt target is particularly suitable for use with oxygen as one of the sputtering gases as it allows the exercise of more control in producing the oxygen content of the MnPt layer, which, in turn, is beneficial for its exchange pinning effects. On the pinning layer there is then formed a synthetic antiferromagnetic (SyAF) pinned layer (70) comprising a first ferromagnetic layer (72) which contacts the pinning layer, on which is formed a non-magnetic antiferromagnetically coupling layer (74), on which is formed a second ferromagnetic layer (76). In this embodiment the first and second ferromagnetic layers are both layers of CoFe, with the first layer being approximately 19 angstroms thick, with a range between 17 and 21 angstroms being acceptable and the second layer being approximately 20 angstroms thick, with a range between 18 and 22 angstroms being acceptable. The non-magnetic coupling layer (74) is a layer of Ru approximately 7.5 angstroms thick, with a range between 7 and 8 angstroms being acceptable. On the SyAF layer (70) there is then formed a non-magnetic spacer layer (80), which in this embodiment is a Cu layer between approximately 16 and 20 angstroms thick, but where approximately 17 angstroms thick is preferred. Unlike the other layers in the sensor, the Cu layer is formed by sputtering only with Ar gas at a pressure of between approximately 0.2 and 0.3 millitorr.

Figure 1B:
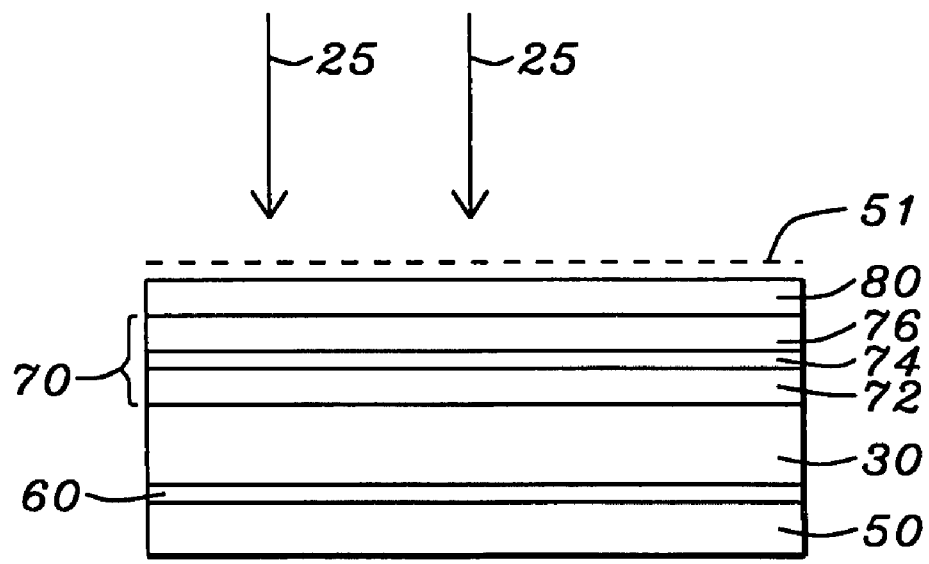

Referring now to FIG. 1b, there is shown the surface of the Cu spacer layer (80) not contacting the SyAF layer now treated with additional oxygen to form an oxygen surfactant layer (OSL), which is shown as a broken line (51). The OSL is less than an atomic mono-layer of oxygen adsorbed on the Cu surface. The OSL formation is most effectively done by placing the Cu layer surface in contact with low-pressure oxygen (arrows (25)) in a separate oxygen-containing chamber (chamber not shown) at a pressure of approximately $3 \times 10^{-5}$ torr for approximately 30 seconds to obtain a total oxygen dose of approximately $10^{-4}$ torr-sec. The OSL layer suppresses interdiffusion between the Cu layer and the CoFe layer which is about to be formed. This, in turn, enhances the spin-dependent transmission coefficient for conduction electrons moving through the sensor and across layer interfaces and, correspondingly, suppresses spin-dependent scattering at those interfaces. As previously noted, the mobility of the absorbed oxygen would allow the OSL to be formed at different depths in the Cu layer. If, for example, an 18 angstrom thick Cu layer is being formed, a first layer of 9 angstroms can be deposited, that layer can then be treated with oxygen, and the remaining 9 angstroms of Cu can then be deposited.

Figure 1C:
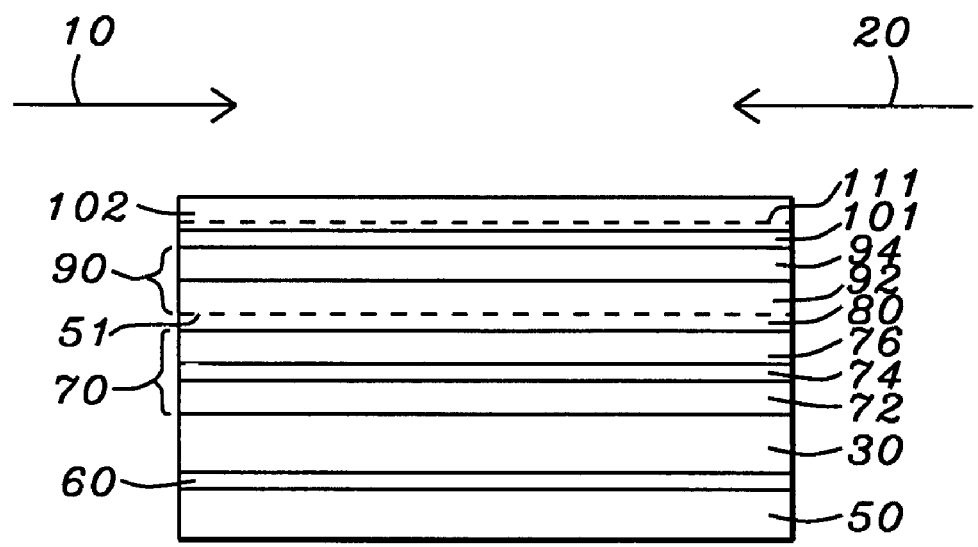

Referring now to FIG. 1c, there is shown the continued deposition on the OSL surface layer (51), using again the Ar/$O_2$ mixture in the low pressure sputtering chamber, a free layer (90), which in this embodiment is a composite layer of CoFe 10/NiFe 15 formed by successive sputtering depositions. The CoFe (92) is formed to a thickness of between approximately 8 and 12 angstroms, but approximately 10 angstroms is preferred and the NiFe (94) is formed to a thickness of between approximately 13 and 18 angstroms, but approximately 15 angstroms is preferred. On the free layer there is finally formed a capping layer. The capping layer is a bilayer comprising a layer of Ru (101) on which is formed a layer of Ta (102). The Ru layer is formed, using only Ar as the sputtering gas (as was the case in forming the Cu spacer layer), between approximately 5 and 10 angstroms in thickness, but where approximately 5 angstroms is preferred. As noted above, the Ru layer (101) is advantageously given a sub-atomic monolayer OSL (dashed line (111)) in the same manner as the Cu layer (exposure to oxygen in a separate chamber, as shown for the Cu layer in FIG. 1b, but which is not shown again), the OSL layer of the Ru layer producing a beneficial oxidation of the final Ta layer. The Ta layer (102) is formed between approximately 10 and 30 angstroms, but approximately 20 angstroms is preferred. It is worth noting that the cryo-pump used to pump down the sputtering chamber needs to be regenerated more frequently if the method is to work at optimal levels.

Figure 2:
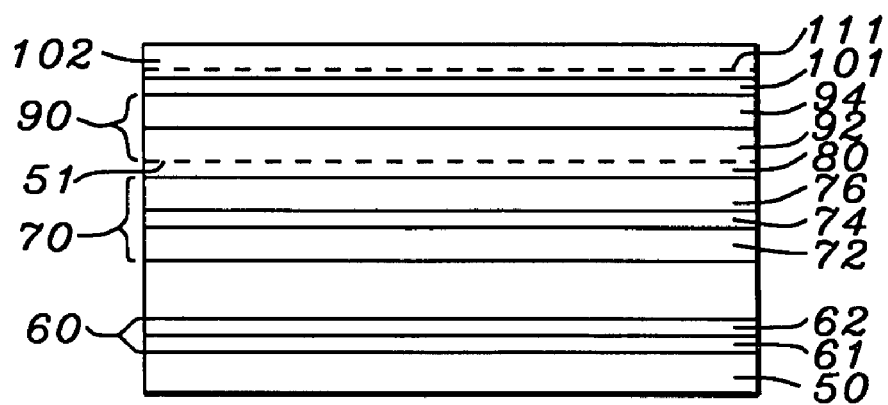
FIG. 2 is a schematic cross-sectional view of a second embodiment of the present invention.

Referring next to FIG. 2, there is shown a schematic cross-sectional view of a completely formed bottom spin valve GMR head formed in accord with the second preferred embodiment of this invention, which is essentially configuration (4) above.

NiCr36/NiFe9/MP125/CoFe19/Ru7.5/CoFe20/Cu17/
OSL/CoFe10/NiFe20/Ru5/Ta20

All the layers of this embodiment and the OSL are formed exactly as the corresponding layers of the first preferred embodiment, the sole difference being the seed layer (60), which in this embodiment is a layer of NiFeCr/NiFe, in which the NiFeCr (61) is preferably formed to a thickness of approximately 36 angstroms, but wherein a range between approximately 34 and 38 angstroms is acceptable. The NiFe (63) is preferably formed to a thickness of approximately 9 angstroms, but a range between approximately 7 and 10 angstroms is acceptable. It is noted that the seed layer of this second embodiment yields superior exchange properties with the MnPt antiferromagnetic pinning layer.

As is understood by a person skilled in the art, the preferred embodiments of the present invention are illustrative of the present invention rather than limiting of the present invention. Revisions and modifications may be made to materials, structures and dimensions provided in forming bottom spin valve GMR sensors capable of reading recordings with ultra-high densities, while still providing the bottom spin valve GMR sensors capable of reading recordings with ultra-high densities in accord with the spirit and scope of the present invention as defined by the appended claims.

What is claimed is:

1. A bottom spin valve GMR sensor element having ultra-thin layers of high density and smoothness with sub-mono-layer thick surface oxygen layers thereon, comprising:

a substrate;

a seed layer formed on said substrate;

an antiferromagnetic pinning layer formed on said seed layer;

a synthetic antiferromagnetic (SyAF) pinned layer formed on said pinning layer;

a Cu spacer layer formed on said SyAF layer, the surface of said spacer layer not contacting said SyAF layer having an oxygen surfactant layer (OSL) formed thereupon;

a ferromagnetic free layer formed on the OSL of said spacer layer;

a Ru capping layer formed on said ferromagnetic free layer, the surface of said Ru layer not contacting said free layer having an OSL formed thereupon;

a Ta capping layer formed on said Ru capping layer; and wherein said seed layer, said pinning layer, said pinned layer and said free layer each have an OSL inherently formed thereon as a result of the incorporation of oxygen during their formation.

2. The element of claim 1 wherein said antiferromagnetic pinning layer is a layer of MnPt sputtered from a source of vacuum melted MnPt containing approximately 38% Mn by atomic weight, said layer being formed to a thickness between approximately 100 and 150 angstroms.

3. The element of claim 1 wherein the synthetic antiferromagnetic (SyAF) pinned layer comprises a first layer of CoFe between approximately 17 and 21 angstroms thick, on which is formed a Ru coupling layer of approximately 7.5 angstroms thickness, on which is formed a second layer of CoFe between approximately 18 and 22 angstroms thick.

4. The element of claim 1 wherein the non-magnetic spacer layer is a layer of Cu between approximately 16 and 20 angstroms thick and the OSL is less than an atomic monolayer thick.

5. The element of claim 1 wherein the ferromagnetic free layer is a double layer comprising a layer of CoFe between approximately 8 and 12 angstroms thick on which is formed a layer of NiFe between approximately 13 and 18 angstroms thick.

6. The element of claim 1 wherein the Ru capping layer is formed between approximately 5 and 10 angstroms thick.

7. The element of claim 1 wherein the Ta capping layer is formed between approximately 10 and 30 angstroms thick.

8. The element of claim 1 wherein said seed layer is a layer of NiCr, having 40% Cr by atomic weight and being formed to a thickness between approximately 35 and 45 angstroms.

9. The element of claim 1 wherein said seed layer is a double layer, comprising a layer of NiFeCr having approximately 40% Cr by atomic weight and of thickness between approximately 35 and 40 angstroms on which is formed a layer of NiFe of thickness between approximately 7 and 10 angstroms.

* * * * *